March 1, 1966 R. A. WITT 3,237,428
MOUNTING ASSEMBLY FOR SHAFT MOUNTED SPEED REDUCER
Filed Dec. 31, 1963 3 Sheets-Sheet 1

INVENTOR
RONALD A. WITT

BY *Thomas W. Ehrmann*

ATTORNEY

March 1, 1966 R. A. WITT 3,237,428
MOUNTING ASSEMBLY FOR SHAFT MOUNTED SPEED REDUCER
Filed Dec. 31, 1963 3 Sheets-Sheet 3

INVENTOR
RONALD A. WITT

BY
*Thomas W. Ehrmann*

ATTORNEY

United States Patent Office 3,237,428
Patented Mar. 1, 1966

3,237,428
MOUNTING ASSEMBLY FOR SHAFT MOUNTED SPEED REDUCER
Ronald A. Witt, Milwaukee, Wis., assignor to The Falk Corporation, Milwaukee, Wis., a corporation of Wisconsin
Filed Dec. 31, 1963, Ser. No. 334,726
5 Claims. (Cl. 64—1)

This invention relates to shaft mounted speed reducer assemblies, and particularly to a mounting assembly for mounting a speed reducer having a hollow shaft upon the cantilevered shaft of a unit to be driven or of a prime mover for support of the speed reducer and the transmission or torque between speed reducer and the cantilevered shaft.

Shaft mounted drives generally include a speed, reducer having a hollow, low speed output shaft, and the sped reducer is adapted to be mounted on a cantilevered driven shaft of the driven equipment by supporting the hollow output shaft upon the driven shaft. Obviously, the hollow output shaft must be connected to the driven shaft for the transmission of torque to the driven equipment. In large speed reducer assemblies, which may include a prime mover and accessory equipment as well as a speed reducer, the weight of the drive is generally greater than the capacity of the cantilevered drive shaft so that it is necessary to support at least a part of the dead weight of the assembly on a support other than the driven shaft. Furthermore, as with all shaft mounted speed reducers it is necessary to provide torque reaction means to counteract the turning forces encountered during operation, and when a separate support is provided this may also function as the torque reaction means. In mounting such large speed reducers assemblies upon the cantilevered driven shaft, considerable problems are encountered in obtaining proper alignment of the cooperating driven shaft and hollow output shaft. Failure to obtain the proper alignment will result in greatly increased wear in both the driving and driven equipment as well as loss in the power transmitted.

In medium and small size speed reducer assemblies which are light enough to be borne by the cantilevered driven shaft, the problems of alignment of the driven shaft within the hollow output shaft of the speed reducer are still present although less severe due to the absence of the separate support. Heretofore, it has been common in the smaller size speed reducer assemblies to simply key the hollow output shaft to the projecting driven shaft. However, because of the extensive mating surfaces of the hollow output shaft and the cantilevered driven shaft in such constructions fretting corrosion often results and it is thereafter most difficult to remove the speed reducer with its hollow output shaft from the driven shaft during disassembly for maintenance or repair.

It is one object of this invention to provide a mounting assembly for a shaft mounted drive including a speed reducer and which insures proper alignment of a hollow speed reducer shaft upon a cantilevered shaft of equipment to be driven or of a prime mover.

It is a further object of this invention to provide a mounting assembly for a shaft mounted speed reducer assembly which provides ease of mounting and dismounting of the speed reducer from a cantilevered shaft and which utilizes no keyways or splines requiring alignment.

It is another object of this invention to provide a mounting assembly for a shaft mounted speed reducer assembly in which a hollow speed reducer shaft is mounted about a cantilevered shaft of driven equipment or of a prime mover and wherein the hollow speed reducer shaft is supported at its ends upon the cantilevered shaft with the intermediate coextensive lengths of the shafts being out of contact so that fretting corrosion is minimized.

It is also an object of this invention to provide such a mounting assembly in which torque is transmitted by frictional engagement between mating surfaces connecting the hollow speed reducer shaft and cantilevered shaft.

The foregoing and other objects will appear in the description to follow. In the description reference is made to the accompanying drawings which form a part hereof and in which there is shown by way of illustration a specific embodiment in which this invention may be practiced. The embodiment will be described in sufficient detail to enable those skilled in the art to practice this invention but it is to be understood that other embodiments of the invention may be used and that structural changes may be made in the embodiment described without departing from the scope of the invention. Consequently, the following detailed description is not to be taken in a limiting sense; instead, the scope of the present invention is best defined by the appended claims.

Figure 1:
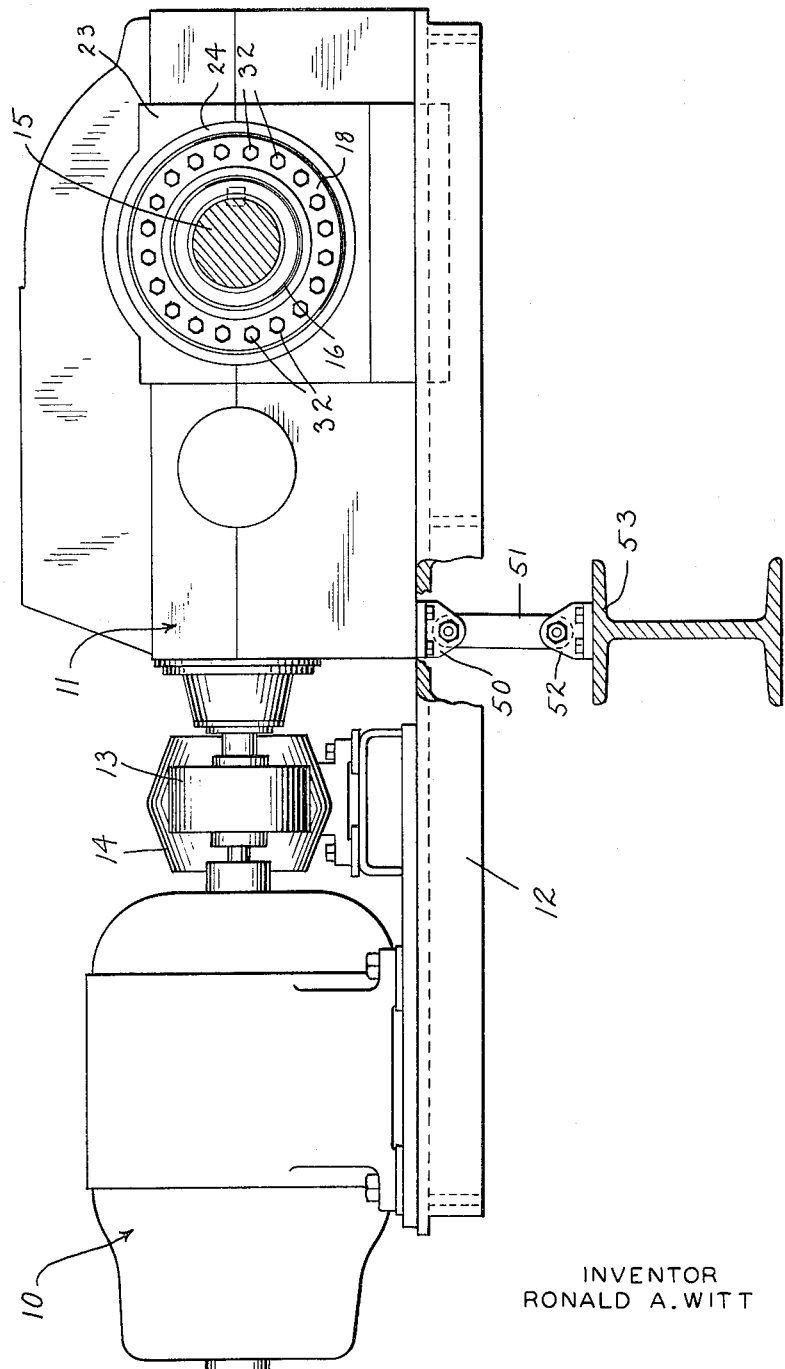
FIG. 1 is a side view in elevation of a shaft mounted drive incorporating the mounting assembly of this invention.
Figure 2:
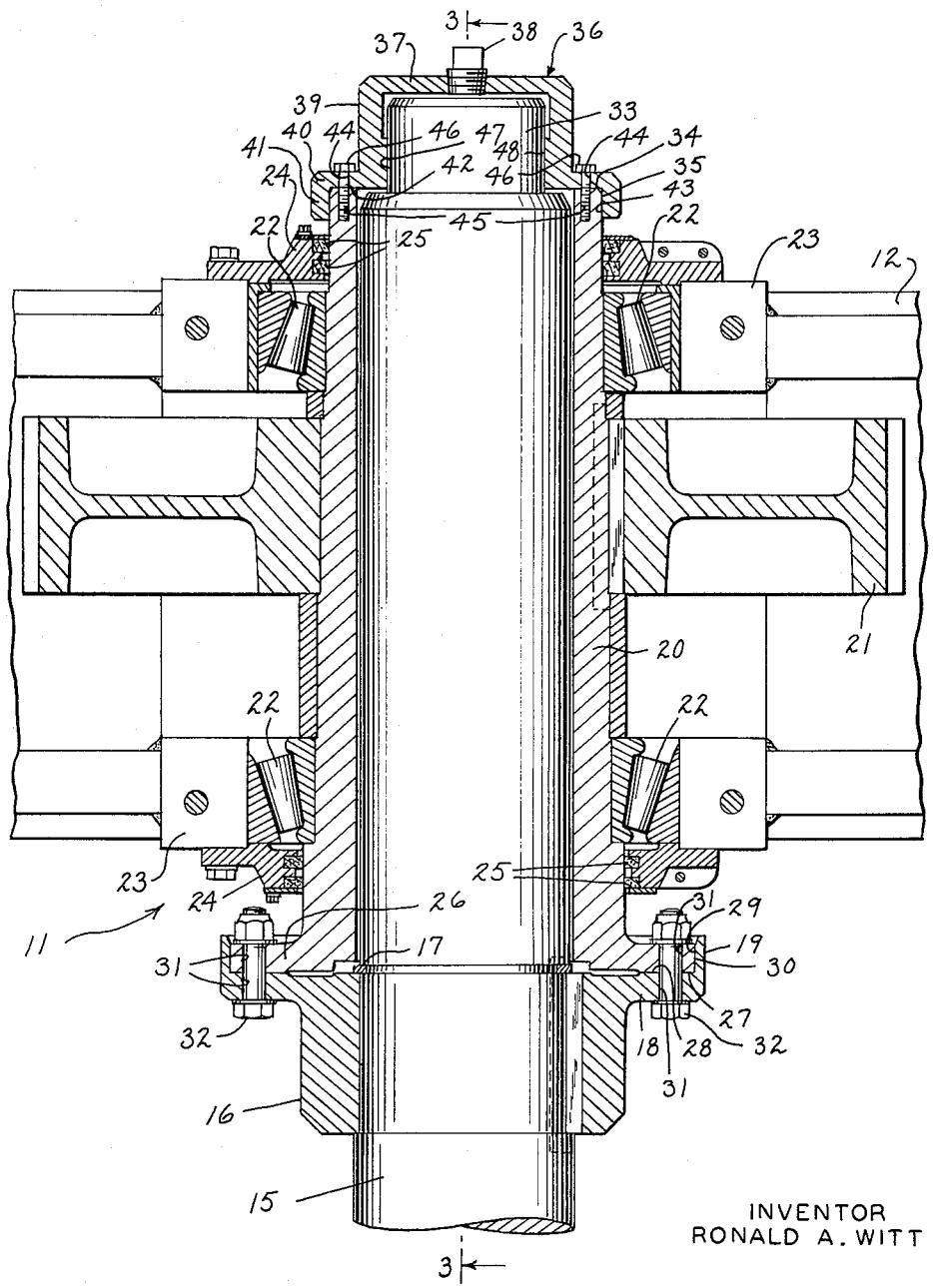
FIG. 2 is a view in horizontal section of a portion of the speed reducer of the drive of FIG. 1 and taken in the plane of a line 2—2 of FIG. 1.
Figure 3:
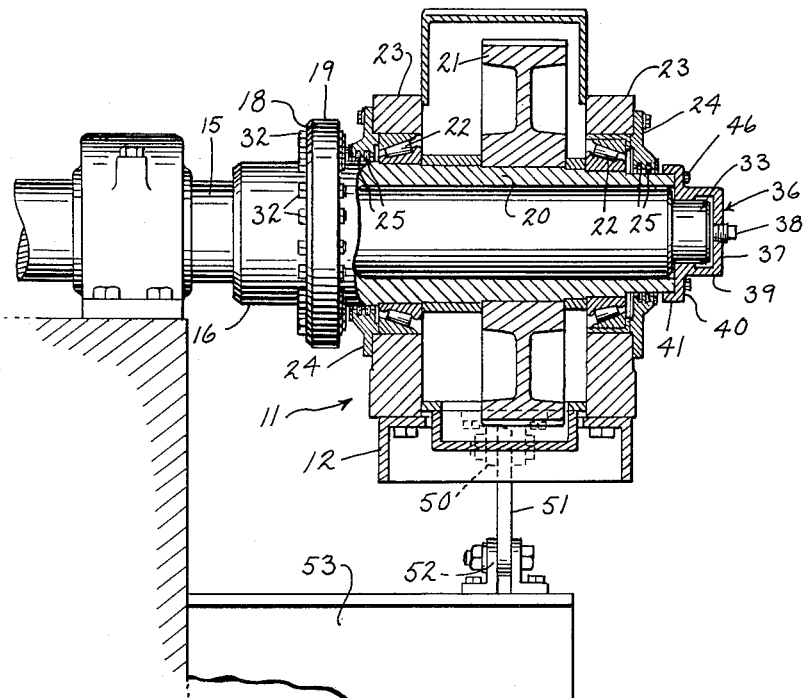
FIG. 3 is a view in vertical section taken in the plane of the line 3—3 of FIG. 2 and further illustrates the reaction point mounting of the drive.

Referring to FIG. 1, there is shown therein a shaft mounted drive which is illustrative of a type of speed reducer assembly which may incorporate the mounting assembly of this invention. The shaft mounted drive includes a motor 10 and a speed reducer 11 mounted upon a common bed plate 12. The output of the motor 10 is connected to the input of the speed reducer 11 by a coupling 13 which may also be provided with a brake 14 which operates upon the coupling 13 to brake the speed reducer 11 in the event of removal of power to the motor 10. The speed reducer 11 shown is a right angle drive which it will be assumed performs a double reduction of input speed and may be of the type illustrated and described in U.S. Patent No. 3,029,661, issued April 17, 1962, to Walter P. Schmitter. The details of construction of the motor 10, the speed reducer 11, the coupling 13 and the brake 14 are generally not germane to the present invention and illustrate merely one environment in which the mounting assembly of this invention may be utilized.

The speed reducer 11 is adapted for mounting upon a cantilevered driven shaft 15 of an item of equipment to be driven. Upon the cantilevered driven shaft 15 adjacent its support there is mounted a coupling hub 16 which is suitably keyed to the driven shaft 15 and the key is axially restrained by a snap ring 17. The coupling hub 16 includes a radial flange 18 having a counterbore which defines an axially extending sleeve 19.

The low speed output shaft of the speed reducer 11 is a hollow shaft 20 which mounts the driven bull gear 21 of the speed reducer 11 and which is journaled in suitable bearings 22 supported in housing walls 23. The ends of the hollow output shaft 20 project outwardly from the housing walls 23, and cap pieces 24 surround the projecting ends of the output shaft 21 and are bolted to the housing walls 23. Oil seals 25 are mounted in the cap pieces 24 to operate upon the outer periphery of the extending ends of the output shaft 20 to seal the bearings 22.

The hollow output shaft 20 has an inner diameter which is greater than the outer diameter of the driven shaft 15 to provide clearance between the driven shaft 15 and output shaft 21 throughout their coextensive lengths. One end of the hollow output shaft 20 is provided with a radial flange 26 adapted to be received within the sleeve 19 of the coupling hub 16 on the driven shaft 15. The radial flange 26 has a machined planar radial surface 27 which abuts in face-to-face contact a machined planar radial surface 28 provided on the flange 18 of the coupling hub 16. The inner peripheral surface of the sleeve 19 is machined to form an internal cylindrical register surface 29 which is concentric with the driven shaft 15. The outer peripheral surface of the flange 26 of the output shaft 20 is similarly machined to form an external cylindrical register surface 30 which is concentric with the output shaft 20. The register surfaces 29 and 30 of the hub 16 and flange 26, respectively, mate in a sliding fit. The flanges 18 and 26 of the coupling hub 16 and output shaft 20, respectively, are provided with a series of peripherally spaced concentric bores 31 which receive bolts 32 that hold the mating surfaces of the flange 26 of the output shapt 20 and the hub 16 in intimate contact.

The free end of the driven shaft 15 is provided with a reduced diameter portion 33 which projects beyond the respective end of the hollow output shaft 20. Such end of the output shaft 20 is machined to present a planar surface 34 and the outer peripheral surface of the output shaft 20 adjacent such end is ground to form an external cylindrical register surface 35 that is concentric with the output shaft 20.

A pilot cover 36 is received over the projecting reduced diameter portion 33 of the driven shaft 15 and also over the respective end of the output shaft 20. The pilot cover 36 has an end wall 37 drilled and tapped to receive a pipe plug 38, a first cylindrical sleeve portion 39 extending from the end wall 37, a flange portion 40 extending radially from the first sleeve portion 39, and a second sleeve portion 41 extending axially from the flange portion 40. The flange portion 40 has a machined planar surface 42 which abuts the planar end surface 34 of the output shaft 20 and the inner peripheral surface of the second sleeve portion 41 is machined to form an internal cylindrical register surface 43 which mates in a sliding fit with the external register surface 35 at the end of the output shaft 20.

The flange portion 40 of the cover 36 is provided with a series of spaced holes 44 and the end of the output shaft 20 is similarly provided with a series of concentric tapped bores 45. Headed studs 46 are journaled through the spaced holes 44 in the flange portion 40 of the cover 36 and are threaded into the tapped bores 45 to hold the cover 36 against the output shaft 20. The projecting portion 33 of the driven shaft 15 and the internal surface of the first sleeve portion 39 are provided with mating machined external and internal register surfaces 47 and 48, respectively, which are respectively concentric with the driven shaft 15 and the register surface 43 of the second sleeve portion 41. The projecting portion 33 is provided with a tapped bore 49 aligned with the opening for the pipe plug 38.

Because of the large weight of the unit of the embodiment shown and also due to the normal torque reaction forces which tend to rotate the unit about the driven shaft 15, it is necessary to provide some auxiliary support for the dead weight of the unit and to provide a torque linkage. In the embodiment described, a clevis 50 is secured to the underside of the bed plate 12 and is joined by a torque link 51 to another clevis 52 mounted on a supporting beam 53. The torque link 51 is loose fitting in the clevises 50 and 52 to permit some weaving of the unit. The clevis 50 is disposed at the center of gravity of the bed plate 12 and its mounted equipment. At rest, the weight of the motor 10, the speed reducer 11, the bed plate 12 and other associated equipment will be borne by the torque link 51 and the driven shaft 15. When the speed reducer unit is in operation the torque reaction forces greatly exceed the weight of the unit and these torque reaction forces are taken up in the link 51. The supporting structure shown is merely illustrative of the kinds of supports which could be provided for the large size speed reducer assembly shown. In smaller size speed reducers, the driven shaft may be of sufficient strength to support the entire weight of the speed reducer making it necessary then only to provide a suitable torque reaction member which connects the speed reducer to a fixed support.

Figure 4:
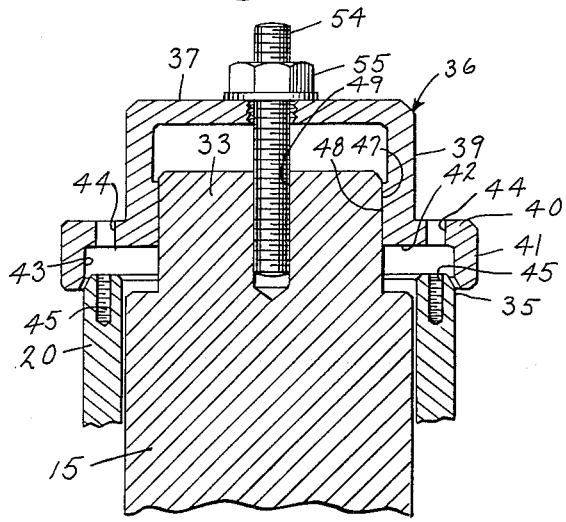
FIG. 4 is a view in horizontal section similar to FIG. 2 and illustrating the method of mounting of the speed reducer.

In describing the assembling of the mounting assembly of this invention, it will be assumed for example that the speed reducer assembly is adapted to drive the head shaft bearing of a belt conveyor and as such may be required to be positioned above ground level. The coupling hub 16 is first mounted on the driven shaft 15 with its key and snap ring 17 in place. The bed plate 12 and mounted equipment is then lifted into position so that the hollow output shaft 20 may be slid onto the driven shaft 15. The output shaft 20 is slid over the driven shaft 15 until the output shaft flange 26 begins to seat within the coupling hub 16. The concentric bores 31 must, of course, be aligned at this time. The pipe plug 38 is removed from the pilot cover 36 and the cover 36 is placed over the projecting end of the driven shaft 15. As shown in FIG. 4, a short length of stud 54 is threaded into the tapped bore 49 provided in the driven shaft 15 and the stud 54 projects through the opening in the cover 36 for the pipe plug 48. A nut 55 is threaded upon the stud 54 and the turning of the nut 55 will drive the output shaft 20 home. The bolts 32 are then secured to bind the output shaft flange 26 to the coupling hub 16. The studs 46 are placed and secured to mount the cover 36 in sliding fit over the reduced diameter portion 33 of the driven shaft 15 and against and about the end of the output shaft 20. The stud 54 is removed and the pipe plug 38 replaced. Finally, the torque link 51 is mounted between the clevises 50 and 52.

The bolts 32 are torqued to a high value so that the mating surfaces of the output shaft flange 26 and the coupling hub 16 are in intimate contact. Thus, torque is transmitted from the output shaft 20 to the driven shaft 15 by the frictional engagement of the mating surfaces, and the shear strength of the bolts 32 is not relied upon for the transmission of power.

It will be appreciated that the mounting assembly insures proper alignment of the hollow output shaft 20 upon the driven shaft 15 by the mating surfaces concentric with the output shaft 20 and driven shaft 15. The output shaft 20 is supported on the driven shaft 15 only at its ends which are widely separated and the major coextensive lengths of both the output shaft 20 and driven shaft 15 are not in contact so that fretting corrosion is minimized. A particular feature is the ease of mounting and dismounting which results from the mounting assembly, and this is a particular advantage when the speed reducer is mounted above ground level and must be lifted and held during assembly and disassembly.

While the mounting assembly has been described in relation to the mounting of a speed reducer output shaft on a driven shaft, it could also function to mount a hollow input speed reducer shaft upon a drive shaft of a prime mover either for speed reduction or speed increase.

I claim:
1. In a mounting assembly for mounting a speed reducer on a cantilevered shaft, the combination comprising: a coupling hub adapted to be secured about said cantilevered shaft adjacent the support for said cantilevered shaft; a hallow shaft for said speed reducer, said hollow shaft being adapted to surround said cantilevered shaft and to have the free end of said cantilevered shaft project beyond said hollow shaft; said hollow shaft having a flange at one end adapted to be removably secured to said coupling hub for support of said hollow shaft; and a cover removably supported on the other end of said hollow shaft and adapted to receive said free end of said cantilevered shaft for support of said hollow shaft.

2. In a shaft mounted speed reducer assembly, the combination comprising: a supported cantilevered shaft; a coupling hub secured about said cantilevered shaft adjacent the support for said cantilevered shaft; a speed reducer having a hollow shaft disposed about said cantilevered shaft, said hollow shaft including a flange at one end removably secured to said coupling hub to provide a first support for said hollow shaft and for the transmission of torque between said hollow shaft and said cantilevered shaft, said cantilevered shaft having its free end projecting beyond the other end of said hollow shaft; and a cover removably supported upon said free end of said cantilevered shaft and releasably secured to said other end of said hollow shaft to provide a second support for said hollow shaft.

3. In a shaft mounted speed reducer assembly, the combination comprising: a supported cantilevered shaft; a coupling hub secured about said cantilivered shaft adjacent the support for said cantilivered shaft; a speed reducer including a housing and a hollow shaft journaled in said housing and extending beyond said housing at both ends, said hollow shaft being disposed about and spaced from said cantilevered shaft, said hollow shaft having a flange at one end removably secured to said coupling hub and the free end of said cantilevered shaft projecting beyond the other end of said hollow shaft; and a cover removably supported upon said free end of said cantilevered shaft and releasably secured to said other end of said hollow shaft, whereby said speed reducer is supported on said cantilevered shaft exteriorly of said housing and solely by said cover and said flange.

4. In a shaft mounted speed reducer assembly, the combination comprising: a cantilevered shaft; a coupling hub secured about said cantilevered shaft adjacent the support for said cantilevered shaft, a speed reducer including a housing and a hollow shaft journaled in said housing and extending beyond said housing at both ends, said hollow shaft being disposed about and spaced from said cantilevered shaft, said output shaft having a flange at one end removably secured to said coupling hub and the free end of said cantilevered shaft projecting beyond the other end of said hollow shaft, said coupling hub and said flange having mating internal and external axially directed register surfaces, the register surface of said coupling hub being concentric with said cantilevered shaft and the register surface of said flange being concentric with said hollow shaft; and a cover received about said free end of said cantilevered shaft and removably secured to said other end of said hollow shaft, said cover and said free end of said cantilevered shaft having mating internal and external axially directed register surfaces respectively concentric with said hollow shaft and said cantilevered shaft.

5. In a shaft mounted speed reducer assembly, the combination comprising: a cantilevered driven shaft having an external cylindrical register surface adjacent its free end and which is concentric with said driven shaft; a coupling hub secured about said driven shaft adjacent the support therefor, said coupling hub having a planar radial surface and an axially extending sleeve portion provided with an internal cylindrical register surface concentric with said driven shaft; a speed reducer including a housing having support walls and a hollow output shaft journaled in said walls and extending beyond said walls at both ends, said output shaft being disposed about and spaced from said driven shaft, said output shaft having a flange at one end removably secured to said coupling hub and said free end of said driven shaft projecting beyond the other end of said output shaft, said flange having a planar radial surface which abuts said planar radial surface of said coupling hub for the transmission of torque between said output shaft and said driven shaft, and also having an external cylindrical register surface concentric with said output shaft and which mates with said internal register surface of said coupling hub; said other end of said output shaft having an external cylindrical register surface concentric with said output shaft; and a cover mounted removably about said other end of said output shaft and receiving said free end of said driven shaft, said cover including a first sleeve portion having an internal cylindrical register surface which mates with said external register surface of said other end of said output shaft, said cover also including a second sleeve portion disposed about said free end of said driven shaft and provided with an internal cylindrical register surface mating with said external register surface of said free end of said driven shaft and which is concentric with said internal register surface of said first sleeve portion of said cover.

References Cited by the Examiner

UNITED STATES PATENTS 1,948,816  2/1934   Hollerith _____ 74—230.3
3,005,323  10/1961  Carter et al. _____ 64—1

BROUGHTON G. DURHAM, *Primary Examiner.*